No. 643,257. Patented Feb. 13, 1900.
E. A. SPERRY.
MOTOR CARRIAGE.
(Application filed Sept. 11, 1899.)
(No Model.)
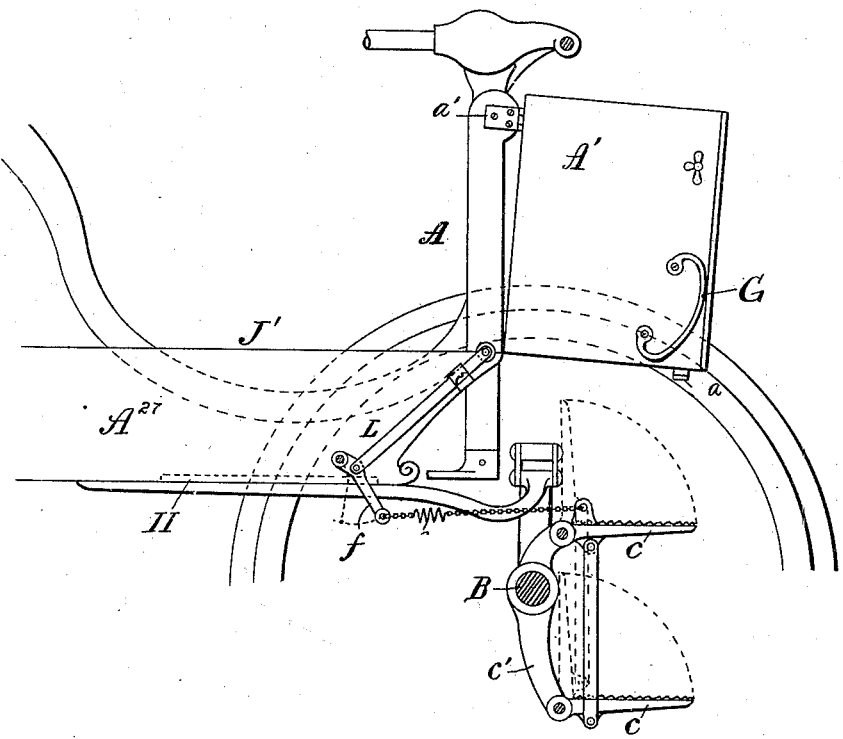
Witnesses:
Inventor.
Elmer A. Sperry,
By Buckingham & Ewart
Attys.

UNITED STATES PATENT OFFICE.

ELMER A. SPERRY, OF CLEVELAND, OHIO.

MOTOR-CARRIAGE.

SPECIFICATION forming part of Letters Patent No. 643,257, dated February 13, 1900.

Application filed September 11, 1899. Serial No. 730,118. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Motor-Carriages, of which the following is a specification.

My invention relates to motor-carriages; and it consists in certain novel devices and arrangement of parts which tend to render the vehicle more accessible and at the same time cheapening the manufacture.

One method of carrying out my invention is illustrated in the accompanying drawing, in which the figure is a view of the forward end of the body and showing the hinged dasher and folding steps.

I have found that vehicles, especially mechanically-driven vehicles, where the guiding-wheels are swiveled at a point at or near the wheel or wheel-hub are difficult of access, especially when the wheels are kept sufficiently back under the vehicle to give a sightly appearance. I have found that by hinging the dasher or otherwise rendering it removable in whole or part easy and unobstructed access to the vehicle may be obtained through its front, overcoming thereby all of the difficulties of inaccessibility of side entrance.

The construction shown will be readily understood from the drawing, the same being a sectional diagrammatic view of a portion of the front end of the buggy, showing the split dasher with hinged portion swung out, affording ready access to the carriage by means of the steps, as indicated. Access is facilitated by the grasping-handle G, located upon the dasher part. The front axle of the carriage will be understood to be non-swiveling. The spring attachment as now appearing in the drawing is of the usual arrangement where a non-swiveling axle is employed constituting a direct connection from the axle B to the end of the spring-yoke located directly above it.

J'' is the floor of the carriage, supplied with the dasher A, with the swinging portion A'. The stationary portion may support the controller. The moving portion is supplied with handles and catch or lock $a$ and hinge $a'$. The steps $c$ $c$ are hinged on a bracket $c'$, suitably fastened to the non-swiveling axle B. The steps may be thrown up by any suitable arrangement, either manually actuated or automatically, by the closing of the door-shaped dasher part A', by impinging on the link L, provided at the top with roller and hinged at the lower end to a lever $f$, which is suitably connected to one or both of the steps by any suitable connection, preferably through a resilient medium $e$.

The operation of the parts of the vehicle will be readily understood from the foregoing and need not be further described.

It will readily be understood that while it is designed to use the above parts in the relation shown, yet some may be used without the others, and the invention extends to such use. It will furthermore be readily understood that the exact construction and arrangement may be varied without departing from the spirit of the invention.

Having thus described my invention, what I claim as new, and desire to secure by Letters Patent, is—

1. In a vehicle, a non-swiveling forward axle, a vehicle-step on such axle, a body for such vehicle, and a swinging door or gate in the front panel or body part near the step.

2. In a carriage, a swinging dasher for the carriage, folding steps for the carriage, and a connection between the dasher and the steps for folding the same when the dasher is in a predetermined position.

3. In a carriage, folding steps for the carriage, mounted upon the running-gear or axle, an actuating device for actuating the step or steps mounted upon the body, and resilient connection from the actuator to the steps.

4. In a vehicle, a non-swiveling forward axle, a body for the vehicle, a vehicle-step connected with such axle, protruding forwardly and located forward of the body proper of the vehicle.

5. In a vehicle, a vehicle step or steps protruding forwardly from the vehicle, a swinging forward panel or body part and a grasping-handle upon the inside of the said part, adapted to swing out to the side of the steps.

6. In a vehicle, folding steps for the vehicle, a moving panel for the vehicle-body, an actuating device extending to the panel for operating the step or steps and a resilient connection from the actuator to the step.

7. In a carriage, a body and running-gear, folding steps for the carriage, mounted upon the gear, an actuating device for operating the step or steps extending to the body and a swiveling connection from the actuator to the step.

ELMER A. SPERRY.

Witnesses:
 WALTER L. UPSON,
 M. C. PRENDERGAST.